US008612293B2

(12) United States Patent
Benyamin et al.

(10) Patent No.: US 8,612,293 B2
(45) Date of Patent: Dec. 17, 2013

(54) GENERATION OF ADVERTISING TARGETING INFORMATION BASED UPON AFFINITY INFORMATION OBTAINED FROM AN ONLINE SOCIAL NETWORK

(75) Inventors: Daniel Benyamin, Los Angeles, CA (US); Aaron Chu, Los Angeles, CA (US); Alex Pollock, Los Angeles, CA (US); Michael Aaron Hall, Valencia, CA (US); Arshavir Blackwell, West Hollywood, CA (US)

(73) Assignee: Citizennet Inc., Los Angeles, CA (US)

( * ) Notice: Subject to any disclaimer, the term of this patent is extended or adjusted under 35 U.S.C. 154(b) by 0 days.

(21) Appl. No.: 13/277,209

(22) Filed: Oct. 19, 2011

(65) Prior Publication Data

US 2012/0158489 A1 Jun. 21, 2012

Related U.S. Application Data

(60) Provisional application No. 61/394,484, filed on Oct. 19, 2010.

(51) Int. Cl.
*G06Q 30/00* (2012.01)

(52) U.S. Cl.
USPC .................. 705/14.54; 705/14.53; 705/14.66; 705/14.49

(58) Field of Classification Search
USPC ....................................... 705/14.54
See application file for complete search history.

(56) References Cited

U.S. PATENT DOCUMENTS

| | | | |
|---|---|---|---|
| 5,465,309 A * | 11/1995 | Johnson | 382/229 |
| 5,835,087 A | 11/1998 | Herz et al. | |
| 5,999,902 A | 12/1999 | Scahill et al. | |
| 6,515,681 B1 | 2/2003 | Knight | |
| 6,571,225 B1 | 5/2003 | Oles et al. | |
| 6,571,234 B1 | 5/2003 | Knight et al. | |
| 6,766,349 B1 | 7/2004 | Belkin | |
| 7,080,139 B1 | 7/2006 | Briggs et al. | |
| 7,089,226 B1 | 8/2006 | Dumais et al. | |
| 7,421,395 B1 | 9/2008 | Link et al. | |
| 7,603,349 B1 | 10/2009 | Kraft et al. | |
| 7,657,515 B1 | 2/2010 | Jewell | |
| 7,734,627 B1 | 6/2010 | Tong | |

(Continued)

OTHER PUBLICATIONS

Pearlman, "Facebook Ads", The Facebook Blog, Nov. 6, 2007, found on line at blog.facebook.com/blog.php?post=6972252130.*

(Continued)

*Primary Examiner* — John G Weiss
*Assistant Examiner* — Scott C Anderson
(74) *Attorney, Agent, or Firm* — KPPB LLP (57) ABSTRACT

Systems and methods for automatically generating targeting information for presentation of an offer via an online social network using affinity information collected concerning members of online social networks in accordance with embodiments of the invention are disclosed. One embodiment includes indexing member profiles within social networks for affinity to keywords using a targeting system that retrieves data concerning member profiles and activities from servers within an online social network, identifying member profiles that have affinity for at least one offer keyword using the targeting system and the index, identifying additional keywords for which the identified member profiles have affinity using the targeting system and the index, determining a set of keywords that target a desired audience based upon the identified additional keywords, and targeting presentation of advertisements for the specific offer to members of an online social network using the online social network and the targeting keywords.

16 Claims, 8 Drawing Sheets

(56) References Cited

U.S. PATENT DOCUMENTS

| | | |
|---|---|---|
| 7,743,051 B1 | 6/2010 | Kashyap et al. |
| 7,860,928 B1 | 12/2010 | Anderson |
| 7,917,528 B1 | 3/2011 | Dave et al. |
| 7,925,496 B1 | 4/2011 | Rubin |
| 7,941,437 B2 | 5/2011 | Cooley |
| 8,086,631 B2 | 12/2011 | Gollapudi et al. |
| 8,301,616 B2 | 10/2012 | Guha et al. |
| 8,380,697 B2 | 2/2013 | Benyamin et al. |
| 2002/0016787 A1* | 2/2002 | Kanno ............ 707/5 |
| 2002/0062368 A1 | 5/2002 | Holtzman et al. |
| 2003/0028595 A1 | 2/2003 | Vogt et al. |
| 2003/0164855 A1 | 9/2003 | Grant et al. |
| 2005/0080613 A1 | 4/2005 | Colledge et al. |
| 2005/0080856 A1 | 4/2005 | Kirsch |
| 2005/0204002 A1 | 9/2005 | Friend |
| 2006/0069589 A1 | 3/2006 | Nigam et al. |
| 2006/0242128 A1 | 10/2006 | Goel |
| 2006/0253437 A1 | 11/2006 | Fain et al. |
| 2006/0282328 A1 | 12/2006 | Gerace et al. |
| 2007/0106500 A1 | 5/2007 | Loofbourrow et al. |
| 2007/0124432 A1 | 5/2007 | Holtzman et al. |
| 2007/0260580 A1 | 11/2007 | Omoigui |
| 2007/0288433 A1 | 12/2007 | Gupta et al. |
| 2008/0021884 A1 | 1/2008 | Jones et al. |
| 2008/0059488 A1 | 3/2008 | Iyengar et al. |
| 2008/0091670 A1 | 4/2008 | Ismalon |
| 2008/0140502 A1* | 6/2008 | Birnholz et al. ............ 705/10 |
| 2008/0172368 A1 | 7/2008 | Chowdhury et al. |
| 2008/0222142 A1 | 9/2008 | O'Donnell |
| 2008/0243842 A1 | 10/2008 | Liang et al. |
| 2008/0294624 A1 | 11/2008 | Kanigsberg et al. |
| 2009/0049127 A1 | 2/2009 | Juan et al. |
| 2009/0063469 A1 | 3/2009 | Gross |
| 2009/0070219 A1 | 3/2009 | D'Angelo et al. |
| 2009/0070346 A1 | 3/2009 | Savona et al. |
| 2009/0109872 A1 | 4/2009 | Skubacz et al. |
| 2009/0119167 A1 | 5/2009 | Kendall et al. |
| 2009/0119261 A1 | 5/2009 | Ismalon |
| 2009/0171686 A1 | 7/2009 | Eberstadt |
| 2009/0177754 A1 | 7/2009 | Brezina et al. |
| 2009/0216696 A1 | 8/2009 | Downs et al. |
| 2009/0276285 A1 | 11/2009 | Nomula |
| 2010/0049534 A1 | 2/2010 | Whitnah et al. |
| 2010/0169327 A1 | 7/2010 | Lindsay et al. |
| 2010/0223279 A1 | 9/2010 | Scott |
| 2010/0268628 A1 | 10/2010 | Pitkow et al. |
| 2010/0293170 A1 | 11/2010 | Hall et al. |
| 2010/0306249 A1 | 12/2010 | Hill et al. |
| 2011/0060794 A1 | 3/2011 | Sweeney |
| 2011/0078130 A1 | 3/2011 | Roizen et al. |
| 2011/0093455 A1 | 4/2011 | Benyamin et al. |
| 2011/0145348 A1 | 6/2011 | Benyamin et al. |
| 2012/0004959 A1 | 1/2012 | Benyamin et al. |
| 2012/0158489 A1 | 6/2012 | Benyamin et al. |
| 2012/0158518 A1 | 6/2012 | Benyamin et al. |
| 2012/0259619 A1 | 10/2012 | Hall |
| 2013/0036107 A1 | 2/2013 | Benyamin et al. |

OTHER PUBLICATIONS

Hein, "How Search Really Works: The Keyword Density Myth", Search Engine People, Feb. 1, 2008, found on line at www.searchenginepeople.com/blog/how-search-really-works-the-keyword-density-myth.html.*

Gamon, "Sentiment classification on customer feedback data: noisy data, large feature vectors, and the role of linguistic analysis", Proceedings of the 20th international conference on Computational Linguistics, Association for Computational Linguistics, 2004.*

Garg et al., "Understanding probabilistic classifiers", Machine Learning: ECML 2001, 2001, pp. 179-191.*

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socio-economic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jun. 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

Joachims, "Text Categorization with Support Vector Machines: Learning with Many Relevant Features", Universitat Dortmund Fachbereich Informatik, Nov. 1997, 18 pgs.

Kim et al., "Literary Style Classification with Deep Linguistic Analysis Features", Source and date unknown, 7 pgs.

Kintsch, "Predication", Source and date unknown, 40 pgs.

Kintsch, "The Role of Knowledge in Discourse Comprehension: A Construction-Integration Model", Psychological Review, 1988, vol. 95, No. 2, pp. 163-182.

Kramer, "An Unobtrusive Behavioral Model of "Gross National Happiness"", CHI 2010: Language 2.0, Apr. 10-15, 2010, pp. 287-290.

Lerman, "Semantic Labeling of Online Information Sources", Source and date unknown, 19 pgs.

Li et al., "Keyword Extraction for Social Snippets", WWW 2010, Apr. 26-30, 2010, 2 pgs.

Lu et al., "Opinion Integration Through Semi-supervised Topic Modeling", WWW 2008, Refereed Track: Data Mining—Modeling, Apr. 21-25, 2008, pp. 121-130.

Meyer, "Support Vector Machines", Source unknown; Sep. 12, 2011, pp. 1-8.

Mishne, "Experiments with Mood Classification in Blog Posts", Style 2005, 8 pgs.

Pang et al., "Opinion Mining and Sentiment Analysis", Foundations and Trends in Information Retrieval, 2008, vol. 2, Nos. 1-2, pp. 1-135.

(56) References Cited

OTHER PUBLICATIONS

Ratkiewicz et al., "Detecting and Tracking the Spread of Astroturf Memes in Microblog Streams", Source unknown, Nov. 2010, 10 pgs.
Scott et al., "Text Classification Using WordNet Hypernyms", Source and date unknown, pp. 45-51.
Sun et al., "Gesundheit! Modeling Contagion through Facebook News Feed", Association for the Advancement of Artificial Intelligence 2009, 8 pgs.
Tyler et al., "Retrieval Models for Audience Selection in Display Advertising", CIKM 2011, 6 pgs.
Wallach, "Topic Modeling: Beyond Bag-of-Words", Source unknown, Jun. 26, 2006, 40 pgs.
Wilson et al., "Term Weighting Schemes for Latent Dirichlet Allocation", Human Language Technologies; The 2010 Annual Conference of the North American Chapter of the ACL, pp. 465-473.
Zheng et al., "A Framework for Authorship Identification of Online Messages: Writing-Style Features and Classification Techniques", Journal of the American Society for Information Science and Technology, 2006, vol. 57, No. 3, pp. 378-393.
Acar et al., "Modeling and Multiway Analysis of Chatroom Tensors", ISI'05 Proceedings of the 2005 IEEE international conference on Intelligence and Security Informatics, 13 pgs.
Liu et al., "Personalized Web Search for Improving Retrieval Effectiveness", IEEE Transactions on Knowledge and Data Engineering, vol. 16, No. 1, Jan. 2004, 35 pgs.
Press, et al., "Numerical Recipes in FORTRAN 77", vol. 1 of Fortran Numerical Recipes: The Art of Scientific Computing, Cambridge University Press, 1992, 5 pgs.

* cited by examiner

GENERATION OF ADVERTISING TARGETING INFORMATION BASED UPON AFFINITY INFORMATION OBTAINED FROM AN ONLINE SOCIAL NETWORK

CROSS-REFERENCE TO RELATED APPLICATIONS

The present application claims priority to U.S. Provisional Application Ser. No. 61/394,484 entitled "Generation of Advertising Targeting Information Based Upon Affinity Information Obtained from an Online Social Network", filed Oct. 19, 2010. The disclosure of U.S. Provisional Application Ser. No. 61/394,484 is incorporated by reference herein in its entirety.

FIELD OF THE INVENTION

The present invention generally relates to online advertising and more specifically to the targeting of display advertising on social networks.

BACKGROUND

Recent advances in online advertising have most prominently been in the field of behavioral targeting. Both web sites and networks tailor their online experiences to individuals or classes of individuals through behavioral targeting. When employed by advertising networks ["ad networks"], behavioral targeting matches advertisers that have a certain desired target audience with websites that have been profiled to draw a specific audience. One of the challenges in behavioral targeting is determining the true extent of the match between a desired audience and the actual audience drawn by a specific web page.

Online social networks, such as the Facebook service provided by Facebook, Inc. of Palo Alto, Calif., are ad networks that have very good knowledge of the visitors to specific pages within the online social network. In order to visit a page within a social network, one typically needs to be a member of the social network. In addition, members of social networks typically provide demographic information and information concerning interests in order to personalize their behavior. For example, a Facebook member could indicate that they are interested in ski vacations to Lake Tahoe by clicking a "Like" button featured on a Lake Tahoe website. A simple advertising strategy would be to target the members of an online social network who have previously indicated interest in the product or service being offered by the advertisement. A flaw with this strategy, however, is that many members that are interested in the advertised offer are not being targeted, because they have not previously indicated a desire for the products or services. More sophisticated advertising strategies attempt to build a demographic and/or geographic profile of a member that will be interested in the advertised offer and target the advertising to members matching the demographic and/or geographic profile. A campaign can be further targeted using keywords to narrow the audience for an ad to people who have interests, which correlate with the advertised offer. In many ad networks, advertisers can bid on keywords. Therefore, targeting users associated with a first keyword can cost significantly more money than targeting users associated with a second keyword. Returning to the example of an advertiser of ski travel packages to Lake Tahoe, the question becomes: who are others that may be interested in a Lake Tahoe vacation package beyond those that have specifically expressed an interest in such a vacation? Probably those who like specific ski resorts would be good candidates, and possibly also those who like specific ski manufacturers. What about those who like gambling? Since the Lake Tahoe area also features a number of casinos, the desired audience for the offer could include members that like to ski and also like to play poker. But not all who like to play poker are good candidates for such a vacation package, and as such advertisement budgets may not be wisely spent on such an audience. Therefore, challenges exist in selecting keywords that appropriately target specific offers to members of a social network.

SUMMARY OF THE INVENTION

Systems and methods in accordance with embodiments of the invention can automatically generating targeting information for presentation of an offer via an online social network using affinity information collected concerning members of one or more online social networks. One embodiment includes a targeting server configured to obtain data from at least one server that forms part of an online social network, where the obtained data describes member profiles of members of the online social network and activities performed on the online social network that are associated with the member profiles. In addition, the targeting server is configured to detect affinities between a member profile and one or more keywords based upon data describing activities associated with the member profile, the targeting server is configured to generate a database containing the member profiles and associating detected affinities between member profiles and keywords, the targeting server is configured to identify member profiles within the database that are associated with an affinity to at least one offer keyword, the targeting server is configured to identify other keywords for which the identified member profiles have an associated affinity, and the targeting server is configured to select a set of keywords including at least one of the identified keywords as targeting keywords for the specific offer, where the selected keywords target the desired audience for the specific offer.

In a further embodiment, the targeting server is configured to provide the targeting keywords to a server that is part of the online social network so that the online social network displays the specific offer to members of the online social network targeted using the targeting keywords.

In another embodiment, the targeting server is configured to score the affinity between a member profile and one or more keywords within data describing an activity associated with the member profile.

In a still further embodiment, the targeting server is configured to determine sentiment related to one or more keywords within data describing an activity associated with a member profile.

In still another embodiment, the targeting server is configured to determine intent related to one or more keywords within data describing an activity associated with a member profile.

In a yet further embodiment, the targeting server is configured to select a set of keywords by clustering the member profiles identified as having associations with an affinity to at least one offer keyword.

In yet another embodiment, the targeting server is configured to assign a feature vector to each of the identified keywords and to estimate the performance of the feature vector in targeting the specific offer to the desired audience.

In a further embodiment again, the feature vector of a keyword includes at least one value indicative of a relationship between the keyword and at least one of the offer keywords.

In another embodiment again, the feature vector of a keyword includes at least one value indicative a relationship between the keyword and at least one cluster of member profiles.

In a further additional embodiment, the targeting server is configured to estimate the performance of the feature vector in targeting the specific offer to the desired audience using a classifier.

In another additional embodiment, the targeting server is configured to estimate performance by estimating the click-through rate of advertising targeted using the keyword.

In still yet further embodiment, the targeting server is configured to select a set of targeting keyword and demographic information combinations.

In still yet another embodiment, the targeting server is configured to select a set of optimal targeting keywords using set completion.

Another further embodiment includes indexing member profiles within one or more social networks for affinity to keywords using a targeting system that retrieves data concerning member profiles and activities from servers within an online social network, identifying member profiles that have affinity for at least one offer keyword using the targeting system and the index, identifying additional keywords for which the identified member profiles have affinity using the targeting system and the index, and determining a set of keywords that target a desired audience based upon the identified additional keywords using the targeting server.

Still another further embodiment also includes targeting presentation of advertisements for the specific offer to members of an online social network using the online social network and the targeting keywords determined by the targeting server.

DETAILED DESCRIPTION OF THE INVENTION

Turning now to the drawings, systems and methods for automatically generating targeting information for presentation of an offer via an online social network using affinity information collected concerning members of one or more online social networks in accordance with embodiments of the invention are illustrated. Affinity information is information concerning whether a member is positively [or negatively] disposed to something or someone. In many embodiments, the targeting system identifies all keywords with which a desired audience is likely to have affinity and automatically determines a set of keywords for targeting an offer to the desired audience. In various embodiments, keywords with which a desired audience is likely to have affinity are automatically determined by identifying users that have affinity with a specific keyword[s] that are the subject of the offer and identifying other keywords with which the identified users also have affinity. Stated another way, if a user expresses an affinity for an offer [or a keyword with the offer], then other keywords for which the user has affinity can be utilized to target advertisements to users that are also likely to have an affinity to the offer. In several embodiments, a set of targeting keywords is determined by estimating the performance of keywords within an advertising campaign of advertisements targeted using a specific keyword or keyword combination. In a number of embodiments performance is estimated by estimating click-through rates for advertisements targeted using a specific keyword or keyword combination using a classifier that takes as inputs a feature vector for each keyword or keyword combination that is measure of the ways in which the keyword or keyword combination is relevant to members that have previously expressed affinity for the subject of the offer or advertisement. In many embodiments, the set of keywords is expanded to reach a broader audience by identifying additional keywords that are semantically similar to the keywords in the optimal set of keywords. Processes for determining the affinity of members of one or more social networks to a set of keywords and automatically determining a set of targeting keywords for targeting specific offers to members of the social network can be performed asynchronously. Systems and methods for determining the affinity of members of an online social network with specific keywords and for automatically determining an optimal set of keywords for targeting an offer are discussed further below.

Advertising Targeting System

Figure 1:
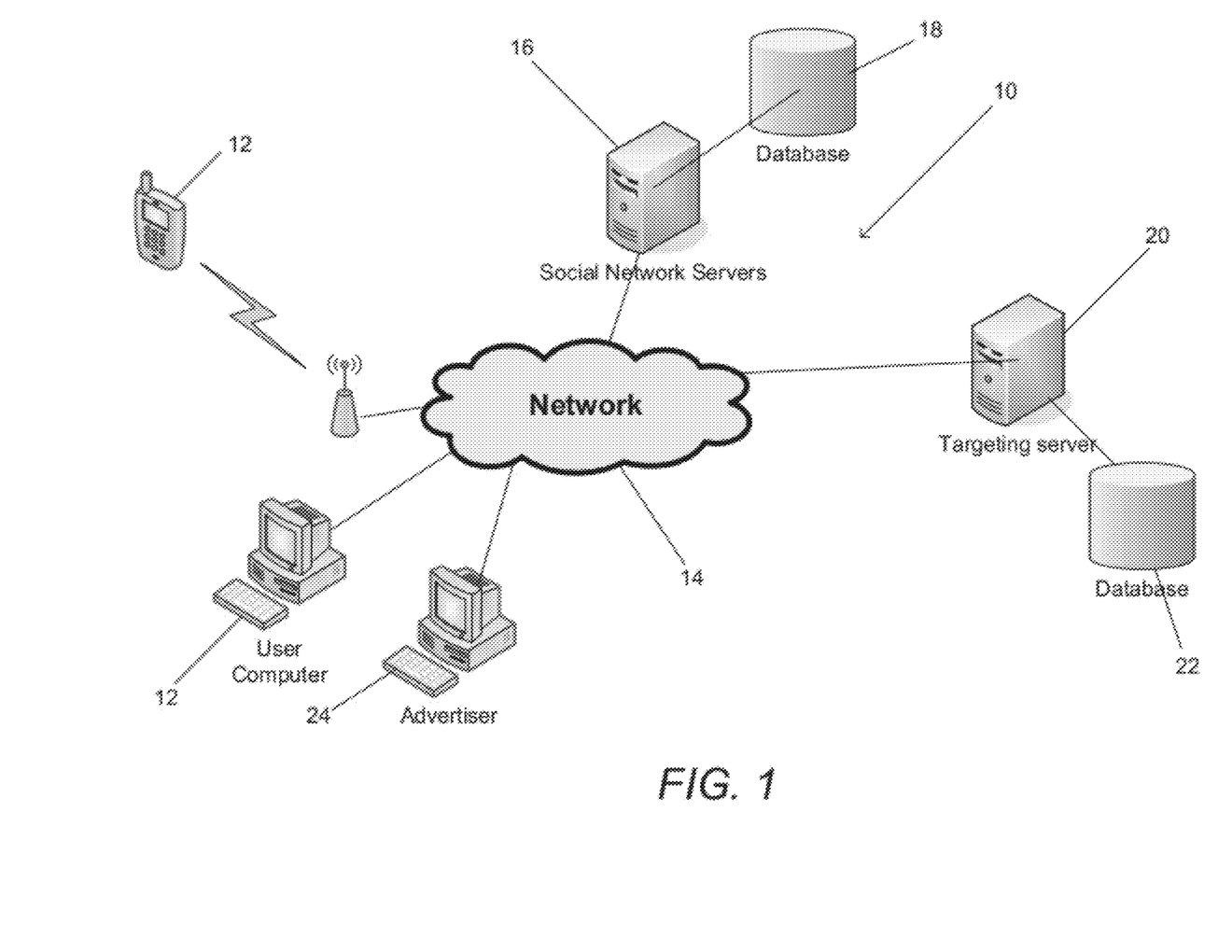
FIG. 1 is a network diagram showing an ad targeting system configured to generate targeting information for offers presented via an online social network in accordance with an embodiment of the invention.

An advertising targeting system in accordance with an embodiment of the invention is illustrated in FIG. 1. In the advertising targeting system 10, users are able to utilize network devices 12 that are network 14 connected to communicate with servers 16 of one or more online social networks. A social network is a term that can be used to describe any online service where individual users can generate and/or upload content. In many instances, users can utilize an online social network to participate in the creation, review, and/or distribution of content. While the term online social network is commonly used to describe sites like the Facebook service provided by Facebook Inc. that have a highly social component, the term is equally applicable to an e-commerce website that provides the ability for users to post reviews and/or any other sites that allow users and/or members to post any form of content. Typically, an online social network includes a database 18 containing profile pages of members of the online social network that is updated in real time by user activities such as status updates, and various other forms of content uploaded to the online social network via users. In many instances, APIs enable third parties to obtain information or data from the online social network concerning member profiles and activities performed by or members [i.e. activities associated with a member profile] and provide applications such as online social games via an online social network. In the illustrated embodiment, a targeting server 20 is configured to access profile information including activities associated with the profiles from the servers within the online social network via such APIs or similar mechanisms. The data obtained by the targeting server can be processed and utilized to build a database of member profiles including demographic information and associate affinities with specific keywords with member profiles. In many embodiments, the targeting server generates affinity information for a subset of the members of the online social network by processing the activity data associated with the member profiles of the subset of members of the online social network. The larger the size of the subset, the more likely that subset is representative of all of the members of the online social network. In several embodiments, the targeting server attempts to generate affinity information for all of the members of the online social network.

When an advertiser attempts to present an offer to members of the online social network, the advertiser can utilize a computing device 24 to provide information concerning the offer to the targeting server 20 and the targeting server can generate a listing of targeting keywords that will optimally target the offer to members of the online social network based upon the affinity information and a predetermined selection or optimality criterion. In many embodiments, the optimality criterion attempts to identify a set of keywords that will reach a desired audience. In several embodiments, the optimality criterion also considers other objectives including [but not limited to] minimizing the extent to which individual members of the online social network are targeted multiple times by the targeting keywords and/or the extent to which members that are unlikely to be interested in the offer are targeted by the targeting keywords. In many embodiments, the optimality criterion also attempts to minimize the number of keywords included in the list of targeting keywords. In a number of embodiments, the optimality criterion utilizes information concerning the relative cost of using individual keywords in targeted advertising and attempts to identify the set of keywords that will reach the desired audience while minimizing multiple targeting of individual members and the targeting of members disinterested in the offer at the lowest cost. In several embodiments, a classifier such as [but not limited to] a neural network is utilized to predict the impact of a keyword [e.g. predicting click-through rates] and these predictions are utilized to select an optimal set of targeting keywords. Predicting keyword impact typically depends upon the requirement of a specific targeting system and the offers targeted by the targeting system.

As is discussed further below, a variety of criteria can be utilized in the selection of targeting keywords based upon affinities expressed by individual users. It should be appreciated, that the term optimality in this context refers to optimization with respect to a specific criterion used in the selection of the keywords. Indeed, the complexity of identifying targeting keywords in the context of online social networks arises due to the fact that the desired audience is unknown. Therefore, any optimality criterion can only ever provide a "best estimate" based upon assumptions inherent within the specified criterion.

Selecting Keywords Covering a Desired Audience

Targeting the presentation of offers to members of an online social network is a complex problem. Perfect targeting information would only present the offer to members of the online social network that are interested in the offer, would not present the offer to any members that were not interested in the offer, and can potentially involve allocating ad impressions evenly across the desired audience. Obtaining perfect targeting for presentation of an offer via an online social network is difficult to say the least, as online social networks rarely directly provide information concerning the current interests of members. In the context of online search advertising, advertising can be targeted based upon the expressed desire of the user for information on a specific topic. Members of online social networks can express affinity for a specific product or service via a mechanism such as a status update or a short message [e.g. a "Tweet" via the Twitter service provided by Twitter, Inc. of San Francisco, Calif.]. As noted above, however, the set of members of an online social network that are likely to be interested in a specific offer typically is not limited to the members that have previously expressed an interest in the offered product or service. Therefore, targeting systems in accordance with many embodiments of the invention attempt to identify a targeting combination that is likely to target advertising to a desired audience based at least upon the affinity to keywords of members of an online social network that have previously expressed affinity to the offer. Processes for targeting keywords based upon the affinity to specific keywords of members of a social network that have previously expressed affinity for an offer in accordance with embodiments of the invention are discussed below.

Processes for Targeting Advertising Using Optimal Keywords

Figure 3:
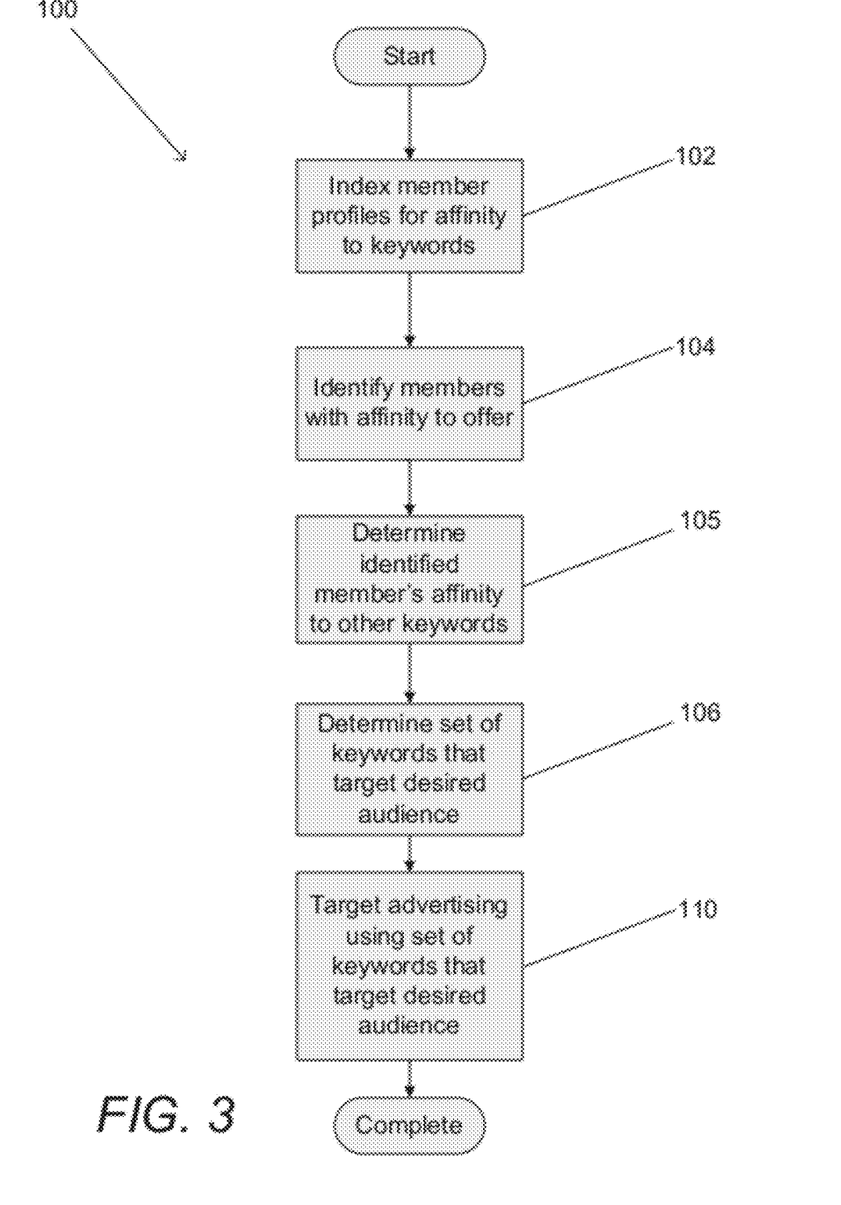
FIG. 3 is a flow chart showing a process for targeting advertising to a desired audience on a social network in accordance with an embodiment of the invention.

In order for a targeting system in accordance with an embodiment of the invention to select targeting keywords that optimally target an offer or advertisement to a desired audience, the targeting system determines the affinity to specific keywords of members of an online social network that have previously expressed affinity to the offer. A process for targeting advertising to a desired audience by identifying the affinity to keywords of members of a social network that have previously expressed affinity to an offer in accordance with an embodiment of the invention is illustrated in FIG. 3. The process 100 includes indexing [102] member or user profiles within one or more social networks for affinity to keywords. Once a database has been obtained that captures the affinity between specific members and specific keywords, members are identified that have expressed affinity to the subject of a specific offer [104] and then other keywords for which those members have expressed affinity are identified [105]. In several embodiments, the process assumes that the keywords for which the identified members have expressed affinity target other members of the desired audience [i.e. members of the social network likely to be interested in the offer]. In many other embodiments of the invention, the keyword[s] utilized to determine affinities between a member and an offer may generated by hand or generated automatically using natural language processing techniques to analyze the offer and web pages or other sites associated with the offer and/or analysis of the affinities of members who have historically accepted such offers. In many embodiments, the affinity of a member to an offer is determined by determining the affinity of the user to the keyword or keywords that is the subject of the offer or advertisement [e.g. a title of a movie].

Based upon all of the keyword affinities expressed by the members identified using the initial list of keywords, a set of targeting keywords is determined [106] to target the desired audience. In many embodiments, the set of targeting keywords can be determined by estimating the likely click through rates of advertisements targeted using specific targeting keywords. Advertising is then presented to members of the online social network targeted [110] using the targeting keywords and/or other demographic information.

Although a specific process for targeting advertising is described above with respect to FIG. 3, any of a variety of processes can be utilized to target advertising using keywords selected based upon at least the affinity to specific keywords of members of one or more social networks that have previously expressed affinity to the subject of the advertisement that are appropriate to a specific application in accordance with embodiments of the invention. Processes for determining affinity between members and a specific keyword and for predicting the effectiveness of specific keywords in targeting a desired audience are discussed further below.

Indexing User Affinities

Figure 4:
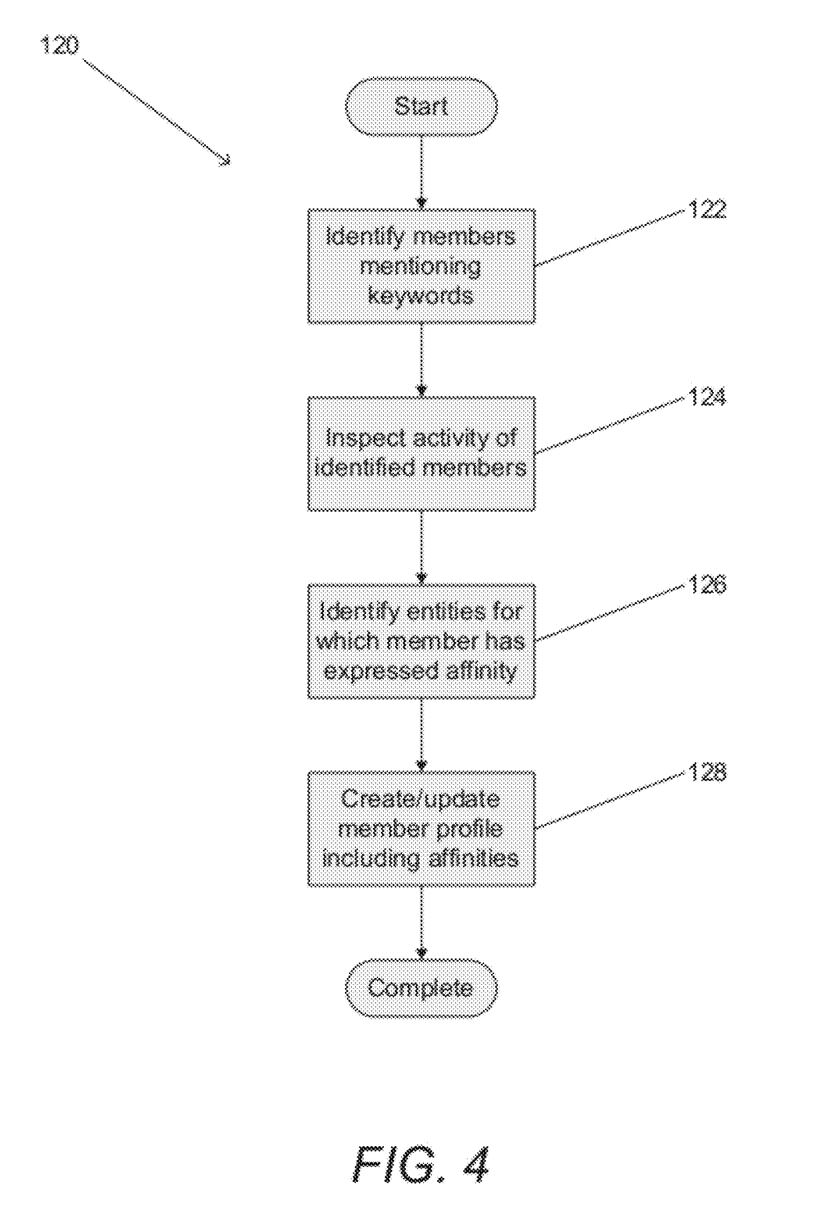
FIG. 4 is a flow chart showing a process for indexing user profiles for affinity to specific keywords in accordance with an embodiment of the invention.

In many embodiments, an index of member affinities is built in response to a request for targeting information based upon a specific offer. In several embodiments, however, the process of indexing affinities expressed by users is performed continuously to reflect the continuous activity of members of online social networks and the database is then utilized on an ongoing basis by an advertising targeting system. A process for indexing member profiles for affinity to specific keywords is illustrated in FIG. 4. The process 120 includes identifying [122] members mentioning keywords via an online social network. The activity of the member is then inspected [124] to identify [126] entities for which the member has expressed affinity. In several embodiments, the additional activity is requested from the online social network via an API. A member profile is then created and/or updated [128] within a database to include the identified affinities. In several embodiments, additional information is collected in the database including but not limited to First Name, Last Name, User ID, the service [where multiple online social networks are indexed in a single database], age, sex and/or geographic location. In this way, the database provides an up to date list of all of the affinities of members identified using the initial set of keywords. As is discussed further below, these affinities then become the basis for determining optimal targeting information.

Identifying Expressions of Affinity

Figure 5:
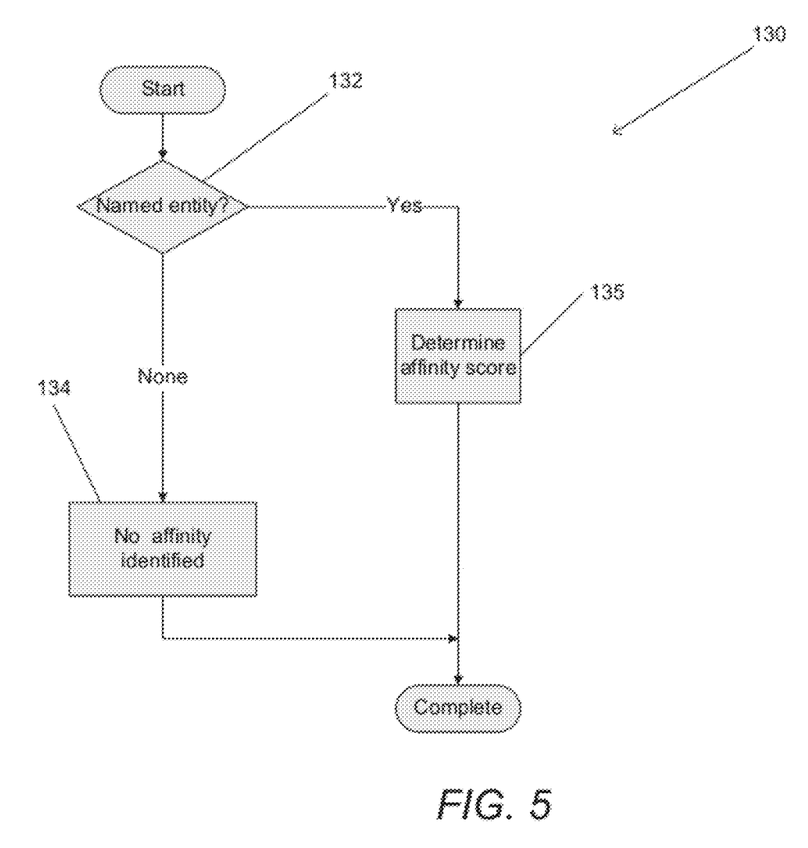
FIG. 5 is a flow chart illustrating a process for identifying whether a short message indicates affinity for a specific keyword in accordance with an embodiment of the invention.

Any of a variety of processes in accordance with embodiments of the invention can be utilized to analyze the activities of users of an online social network to determine whether specific members are expressing affinities for a particular keyword. One process for determining whether an activity expresses affinity with a specific keyword in accordance with an embodiment of the invention is illustrated in FIG. 5. The process 130 involves analyzing data describing activities performed on an online social network to determine [132] if the activity involves, references, and/or relates to a named entity, such as a person, place or thing. In the context of online social networks, an activity includes [but is not limited to] commenting, voting, reviewing, rating, purchasing, launching, listening, propagating content, viewing content and/or any other interaction supported by a specific online social network. In many embodiments, the determination is made by identifying whether the activity includes any word that matches a database of named entities such as the Freebase graph of people, places and things provided by Google, Inc. In the illustrated embodiment, the set of keyword affinities that can be indexed is limited to named entities. In other embodiments, a more expansive or a more restrictive set of keywords can be indexed. If the activity does not include a named entity, then the process determines [134] that no affinity is expressed by the activity. In the event that the activity includes a named entity, then the process determines [135] whether the activity expresses affinity for the named entity. In several embodiments, affinity to keywords is determined based upon sentiment and/or intent expressed by an activity performed by the member of the social network [see discussion below]. In many embodiments of the invention, an affinity score is determined utilizing a process similar to the processes disclosed in U.S. patent application Ser. No. 13/103, 990 entitled "Systems and Methods for Measuring Consumer Affinity and Predicting Business Outcomes Using Social Network Activity" to Benyamin et al., filed Mar. 9, 2011 the disclosure of which is incorporated by reference herein in its entirety. The affinity score can be combined with other factors, including a threshold factor based on the specific keyword.

Figure 5A:
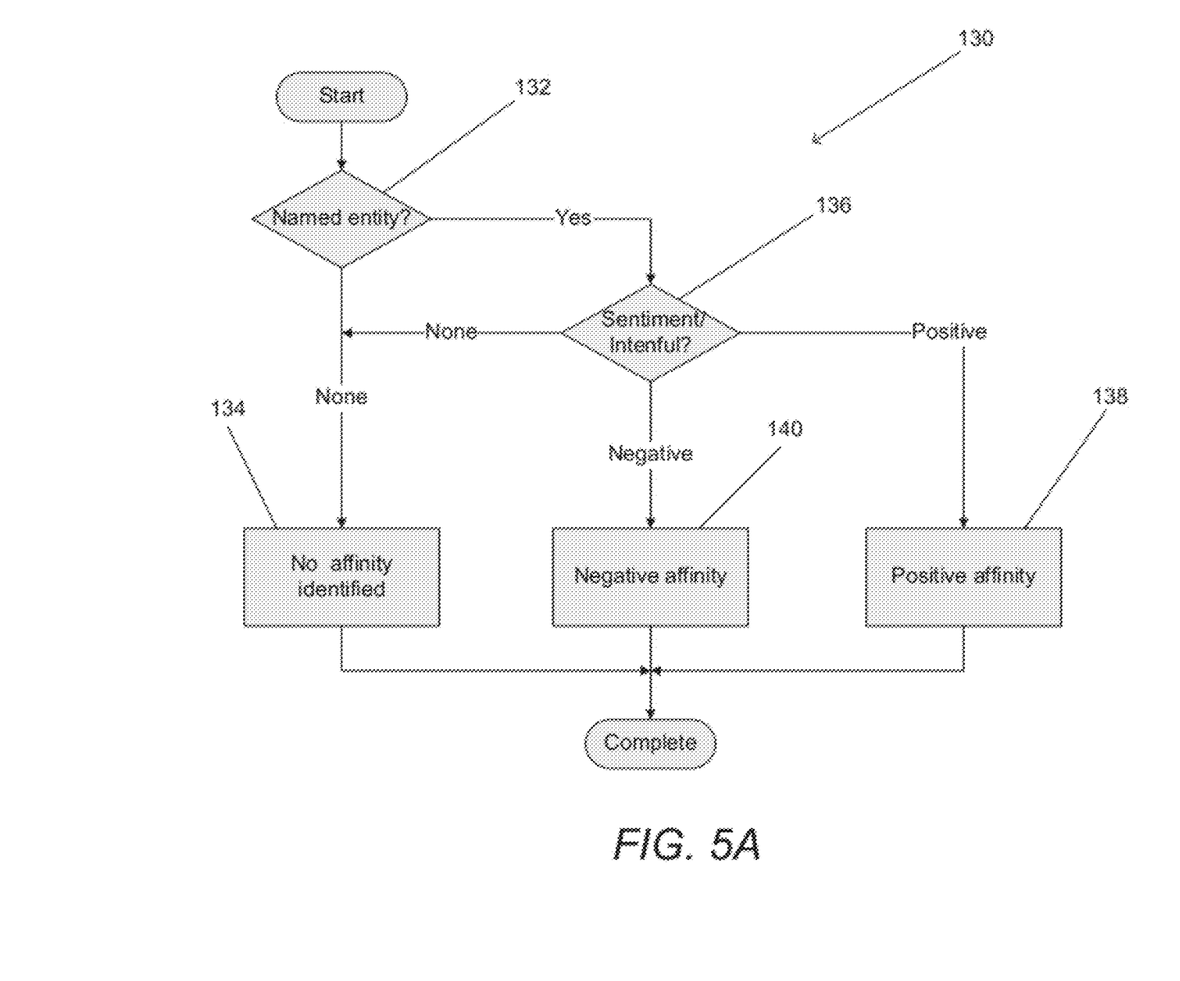
FIG. 5A is a flow chart illustrating another process for identifying whether a short message indicates affinity for a specific keyword in accordance with an embodiment of the invention.

In many other embodiments, a determination of affinity is expressed based upon an expression of a positive [or negative] sentiment and/or an expression that is "intentful" [i.e. expresses an intention to perform an action with respect to the named entity]. An embodiment of a process that attempt to determine and categorize affinity in accordance with an embodiment of the invention is shown in FIG. 5A. In the event that the activity expresses no clear affinity, the activity is classified [134] as not expressing an affinity. In the event a positive affinity is expressed, the activity is classified [138] as expressing a positive affinity with respect to the named entity. As noted above, the expression of positive affinity to the named entity can then be associated with the targeting system's profile of the member responsible for the activity. Similarly, when a negative affinity is expressed, the activity is classified [140] as expressing a negative affinity with respect to the named entity and a negative affinity to the named entity can be associated with the member's profile in the targeting system.

Although specific processes are illustrated in FIG. 5 and FIG. 5A for determining whether an activity contains an expression of affinity with respect to a specific keyword, other processes appropriate to the requirements of a specific application, including but not limited to processes that only detect positive affinity, can also be utilized in accordance with embodiments of the invention. Various processes for detecting sentiment and intent with respect to a specific keyword are discussed further below.

Determining Sentiment

In a number of embodiments, sentiment can be determined by building a statistical classifier. A statistical classifier can be constructed using a training data set in which each activity is classified as expressing a positive sentiment, negative sentiment, and in many instances no clear sentiment. Words in the training data set of activities can then be matched with a set of strongly polarizing sentiment words, which may be generated by hand and can include emoticons [i.e. combinations of characters that form symbols used to indicate sentiment and/ or emotion]. Examples of strongly polarized words include but are not limited to "love", "hate", "adore", and "despise". Depending upon context, such words do not necessarily convey positive or negative sentiment [e.g. "I could never love . . ."]. A list of individual words and word pairs can then be generated ignoring the strongly polarized words and the named entity in each activity. The activities can then be provided to a sentence parser, such as the Stanford parser distributed by the Stanford Natural Language Processing Group at Stanford University, to generate a list of grammatical relationships between the words in the list and the named entity. The lists of single words, word pairs, and grammatical relationships-can then be used to train a statistical classifier. In many embodiments, the statistical classifier is a maximum entropy classifier. In a number of embodiments, other types of statistical classifiers including but not limited to a Bayesian or Naïve-Bayesian classifier can be utilized.

In several embodiments, separate statistical classifiers can be created depending upon categorization of the topic of a specific activity. For example, separate classifiers can be created for the categories sports, music, and politics. In many instances, different words and different word relationships are used to express sentiment in different contents and these differences can be captured using the different statistical classifiers. The categorization of short messages is described in U.S. patent application Ser. No. 12/781,799, the disclosure of which is incorporated by reference herein in its entirety.

Identifying "Intentful" Expressions

In many embodiments, a determination is made concerning whether an activity expresses intent with respect to a named entity by comparing the words in the activity to a list of intentful verbs. In several embodiments, the topic of the activity is determined and a separate list of intentful verbs is provided for each topic. In a number of embodiments, the activity is also provided to a sentence parser to identify the named entity that is the subject of the intentful verb. In other embodiments, any of a variety of techniques can be used to generate a list of intentful verbs and/or to determine whether intent with respect to a specific named entity is expressed within an activity.

Determining an Optimal Set of Keywords for Targeting an Offer

Figure 6:
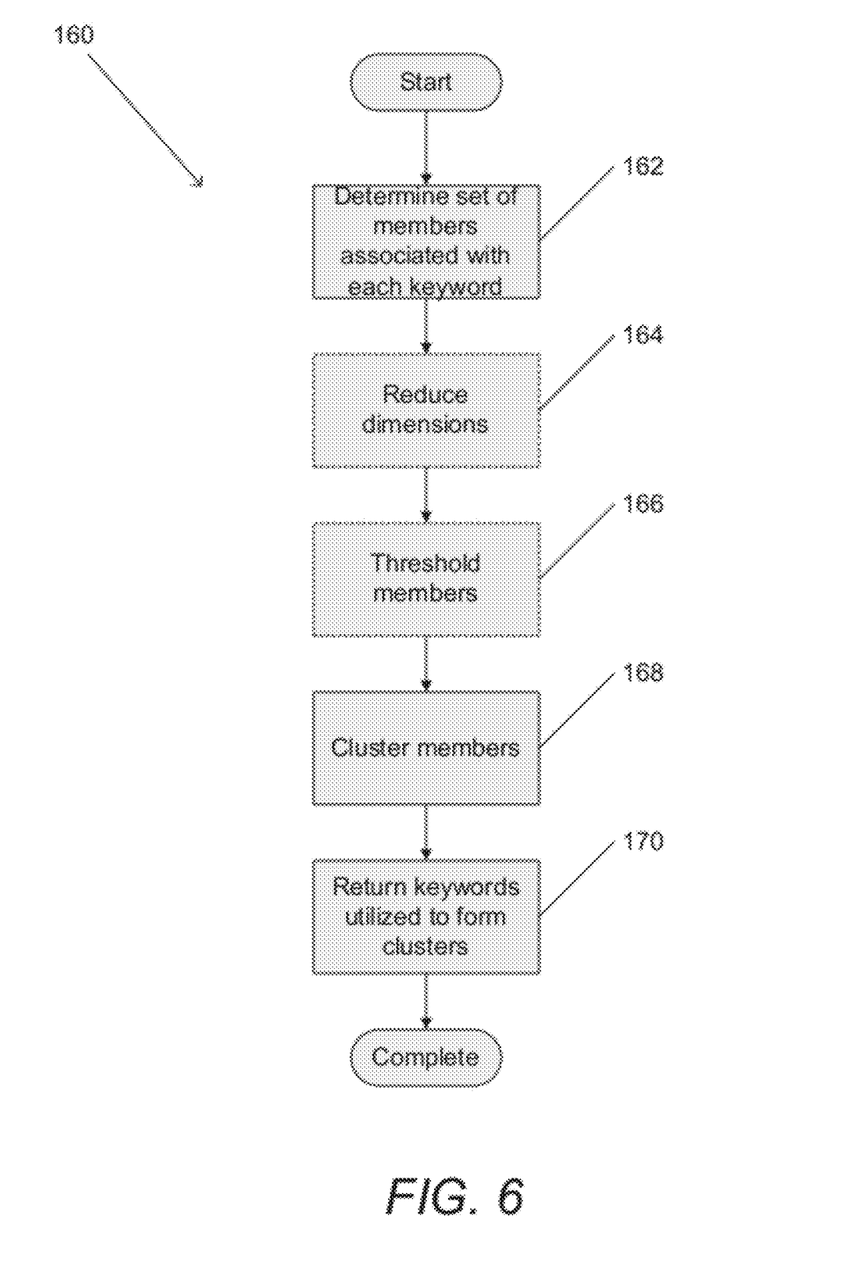
FIG. 6 is a flow chart illustrating a process for determining a set of keywords that optimally covers a desired audience for an offer in accordance with an embodiment of the invention.

A process for determining a set of targeting keywords for targeting an offer to members of an online social network using information concerning affinities between specific users and specific keywords in accordance with an embodiment of the invention is illustrated in FIG. 6. As noted above, the targeting process involves identifying members of one or more social networks that have expressed affinity for a keyword or list of keywords associated with an offer and then determining a list of additional keywords for which the identified members have also expressed affinity [162]. In many embodiments, after the database of affinities between specific members and specific keywords has been created the database can be queried to determine the members targeted by specific keywords or specific combinations of keywords. The identified members can be clustered. In many embodiments, clustering provides insights concerning distinct segments of the desired audience and can facilitate the selection of a set of targeting keywords that target members of online social networks falling within each of the segments and not just segments strongly represented by the members identified using the offer keyword[s].

Typically, a database generated in accordance with embodiments of the invention is sparse and so the dimensionality of the data within the database concerning the identified members can be reduced [164]. In many embodiments of the invention, the dimension of the group of members retrieved can be reduced using random projection. In other embodiments of the invention, any of a variety of processes appropriate for reducing the dimensionality of a dataset can be used to reduce the dimensionality and improve the ability of the process to cluster members that have expressed affinity to the object.

A threshold can be applied to the group of members retrieved [166] to further reduce the size of the group considered by the process. In several embodiments of the invention, the threshold can be based on positive affinity for a given keyword or combination of keywords. In a number of embodiments of the invention, the threshold can be based on a negative affinity for a given keyword or combination of keywords. In several embodiments of the invention, the threshold can be based on demographic attributes. In many embodiments, the threshold can be based on topics which the members have previously discussed. In still other embodiments, the threshold can be based on a combination of factors.

Members can be clustered together into groups based on demographic information and their affinity for specific keywords or combinations of keywords [168]. In many embodiments of the invention, a growing hierarchical self-organizing map is used to cluster members. In other embodiments, any of a variety of clustering algorithms appropriate to a specific application can be utilized in accordance with an embodiment of the invention. During clustering, groups of members can be formed based upon demographic information and specific keywords or groups of keywords for which the members have affinity. The clusters can then be utilized to score keywords [or keyword combinations] to generate a set of demographic information and/or keywords that target a desired audience. In many embodiments, a keyword or keyword combination is scored by generating a feature vector that describes relevant characteristics of the keyword. For example, the feature vector can include the Jaccard index of the keyword as a measure of the extent to which the members targeted by the keyword includes members that have previously expressed affinity for the subject to an offer or advertisement. The feature vector can be dependent upon the characteristics of the offer [i.e. the offer keyword[s]], the cluster, the keyword itself and/or other keywords. Relating the keyword to the cluster in the feature vector can enable a classifier to determine the extent to which a keyword is relevant to targeting an offer to a specific group within the desired audience. Therefore, keywords that particularly resonate with a specific demographic [for example women aged 35-44] can be identified and utilized in the targeting of advertising. The ability to target advertising to specific segments making up a desired audience can be useful where the members that have expressed affinity to an offer keyword[s] are not evenly distributed across the segments of the desired audience. In addition, the clusters enable the selection of set of keywords that target each of the segments of the desired audience and reduces the likelihood that targeting keywords will be selected that strongly target discrete segments within the desired audience. The feature vector need not be limited to a single measure and any of a variety of measures can be utilized to measure the extent to which a keyword targets a portion of a desired audience in accordance with embodiments of the invention. In this way, the clusters provide insight into the keywords that are most likely to target members of a desired audience and, as is discussed further below, can be used to select targeting demographic information and/or keywords for use in targeting an advertising campaign. The set of targeting keywords can then be returned [170] by the targeting system and provided to the online social network by the advertiser to enable the targeting of the offer.

Selecting Targeting Keywords

A variety of techniques can be utilized to identify keywords for which members of a desired audience are likely to have affinity. In many embodiments, specific targeting keywords are selected from the group of keywords for which a desired audience is likely to have affinity by estimating the performance of the keywords with respect to a specific advertising campaign and then selecting the highest performing keywords. In a number of embodiments, the performance of a specific keyword or combination of keywords within a campaign is determined using a classifier that is trained to predict the performance of keywords within a campaign based upon feature vectors assigned to the keywords using a process similar to any of the processes outlined above. In many embodiments, the performance of a targeting keyword can be defined as the click-through rate for advertisements displayed within a social network based upon the targeting keywords. In several embodiments a neural network is utilized to score the expected click-through rate of keywords based upon their feature vectors. The click-through rate predictions in combination with the budget for the advertising campaign can be utilized to determine the keywords and/or keyword combinations that will reach the largest audience.

In the event that the identified keywords and/or keyword combinations are unlikely to reach a sufficiently large number of members of the social network, then the set of targeting keywords that the classifier estimates will perform well in the advertising campaign can be utilized to identify additional targeting keywords. In a number of embodiments the targeting system can run an initial campaign with the objective of stimulating additional activity with respect to the subject of the campaign. The additional activity contributes to an expanded set of data that can provide additional insights into the keywords for which members of the desired audience are likely to have affinity. In many embodiments, the targeting keywords are utilized to identify similar keywords that can be utilized as targeting keywords. In several embodiments, webpages containing semantic information concerning a targeting keyword or a combination of targeting keywords can be processed using natural language processing techniques to identify keywords that have the same or a sufficiently similar meaning to be useful in targeting advertising. For example, a targeting system can review a Wikipedia entry related to a keyword or keyword combination and identify other named entities on the Wikipedia pages. The affinity of members in the desired audience to these keywords can be measured. In other embodiments, a predetermined number of web pages can be processed and the affinity of members within the desired audience to entities listed on the web pages measured.

Although specific processes are discussed above with respect to the selection of targeting keywords from a set of keywords that are likely to identify members of a desired audience, any of a variety of processes appropriate to a specific application can be utilized in accordance with an embodiment of the invention.

Targeting Using Set Covering

Targeting systems in accordance with embodiments of the invention are described above that identify members of social networks that have previously expressed an affinity for a particular offer and use that information to determine targeting keywords that are likely to target the entire audience of members of the social network[s]that are likely to be interested in a particular offer. In many embodiments, the targeting systems build an optimal targeting combination using a variant of a process known as "set covering". A "set covering" problem is typically regarded as being any problem that can be formulated in terms of a given universe including a family of subsets within the universe, where the solution involves determining the minimum number of subsets that cover the entire universe. The targeting problem is more complex in that the desired audience is an unknown subset of the universe of members, and the subsets associated with each of the keywords are usually approximated based upon a sample of the members that make up the universe of members. However, similarity exists in that the goal of the targeting problem is to select the subsets [i.e. the keywords] that cover what is estimated to be the desired audience in accordance with a predetermined optimality criterion.

Figure 2:
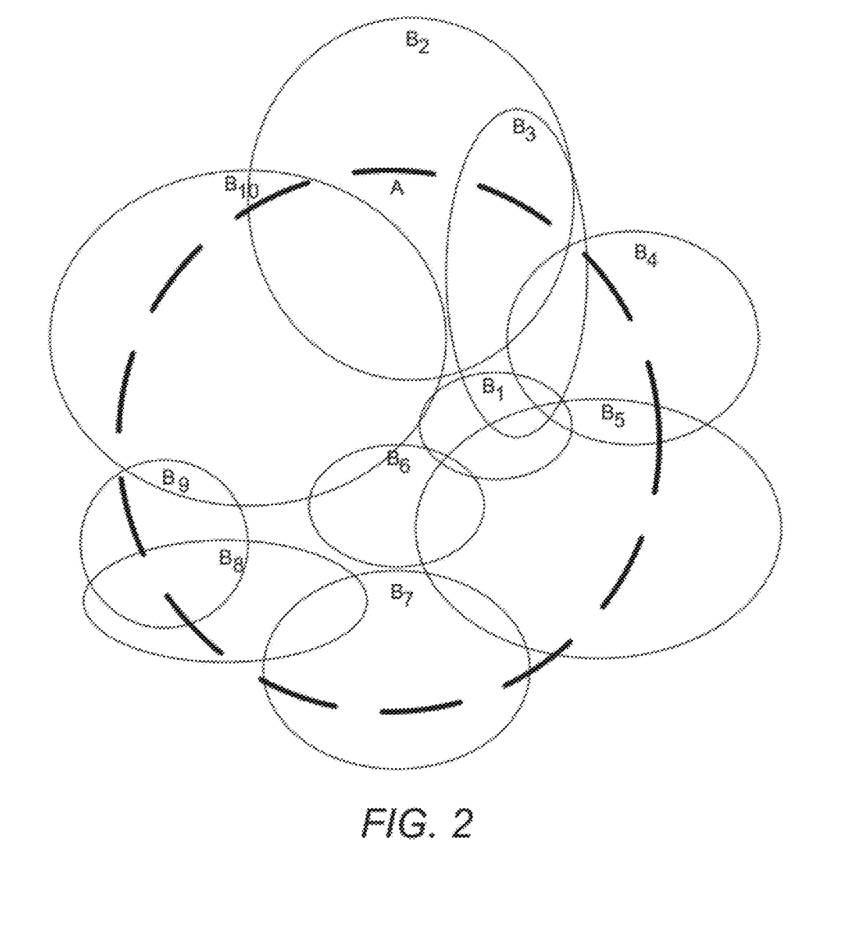
FIG. 2 is a set diagram conceptually illustrating selection of keywords intended to reach a desired audience on a social network.

The formulation of keyword targeting as a variant of the set covering problem is illustrated in FIG. 2. An estimate of the desired audience [A] is indicated by a dashed line and members targeted by keywords $B_1, \ldots, B_{10}$ are indicated by the sets $B_1, \ldots, B_{10}$. In the standard set covering problem, the objective is simply to span the universe using the smallest number of subsets. When selecting targeting keywords, the optimality problem can be significantly more complex as certain keywords can be more expensive, overlaps between the members targeted by specific keywords can be desirable and keywords that target significant numbers of members that are not part of the desired audience can also be undesirable.

In a number of embodiments, targeting keywords can be selected by selecting the keywords [i.e. $B_1, \ldots B_n$] that minimize the following cost function:

$$\text{Score} = |A| - \sum_n |A \mid B_n| + \sum_{n,m} |B_m \mid B_n| + \sum_n (|B_n| - |A \mid B_n|)$$

The above cost function measures the extent to which the keywords target the desired audience. The score is decreased by the extent to which the keywords cover the desired audience [i.e. the second term of the cost function] and the score is increased by the extent to which specific keywords target the same people [i.e. the third term of the cost function]. The score is also increased by the extent to which specific keywords target people, who are not within the desired audience [i.e. the fourth term of the cost function]. Ideally, a set of keywords would only target the desired audience, and the keywords would not target any of the same people. In which case, the score would be 0. Although a specific cost function is presented above other cost functions can be utilized as appropriate to the requirements of a specific application in accordance with embodiments of the invention.

As noted above, many ad networks operate on an auction model, where the price paid for advertising is determined by competition with other advertisers. Targeting systems in accordance with embodiments of the invention can store the cost [Cn]associated with each keyword for which a user has expressed affinity and can use cost as a criterion when selecting targeting keywords. In several embodiments, the optimality criterion includes a cost function that accounts for the cost of specific keywords and/or errors in the approximations of the set of members that are targeted by specific keywords such as, but not limited to, the following cost function:

$$\text{Score} = |A| - \sum_n C_n \cdot |A \cap B_n| + \sum_{n,m} |B_m \cap B_n| + \sum_n (|B_n| - |A \cap B_n|) + E \cdot N$$

where N is the number of keywords used to cover the desired audience.

Any of a number of known algorithms can be utilized in the optimization of the above cost functions including a greedy algorithm and other algorithms that produce acceptable although potentially sub-optimal solutions with reduced processing overhead compared to an algorithm that produces an optimal solution.

Although specific cost functions and optimization techniques are discussed above, alternative cost functions including, but not limited to, cost functions that include after the fact information such as ad performance can also be utilized in accordance with embodiments of the invention. Processes for selecting targeting keywords and for estimating members targeted by specific keywords are discussed further below.

Figure 7:
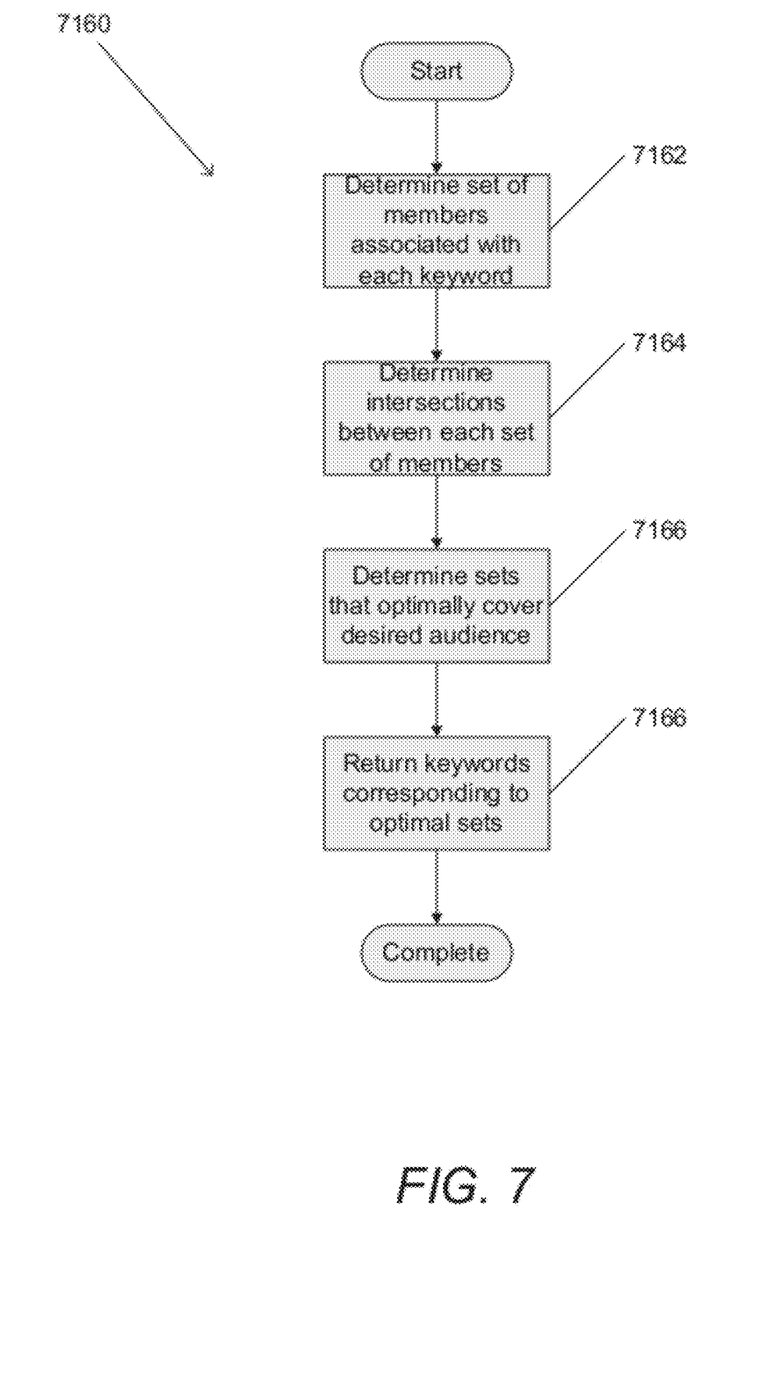
FIG. 7 is a flow chart illustrating a process for determining a set of keywords that optimally covers a desired audience for an offer in accordance with an embodiment of the invention.

A process for determining an optimal set of keywords for targeting an offer to members of an online social network using information concerning affinities between specific users and specific keywords in accordance with an embodiment of the invention is illustrated in FIG. 7. As noted above, the targeting process involves determining a list of all keywords for which members identified by an initial set of key words related to an offer have expressed affinity. The process 7160 involves determining [7162] the number of members that have expressed affinity to each keyword on the list and determining [7164] the number of members that have expressed affinity for each pair of keywords on the list. These counts can then be used in combination with other information, including but not limited to the relative cost of each keyword, to determine [7166] a set of keywords that optimally targets the desired audience utilizing a cost function similar to the cost functions discussed above. The optimal set of keywords can then be returned [7168] by the targeting system and provided to the online social network by the advertiser to enable the targeting of the offer.

The process described with respect to FIG. 7 relies upon the creation of an index of members that is a statistically significant sample of the universe of members of a specific online social network. In several embodiments, a list of N keywords is manually generated or generated by natural language processing of relevant sources of information and then the list is used to query a web indexing service, such as the Google service provided by Google, Inc., using each keyword and each pair of keywords and then counting the number of "hits" within a social networking service. Such a process can be more computationally efficient for a targeting system; however, the process relies upon the extent to which the web indexing service is caching activity on the social network. Therefore, the number of hits may not be a reliable indication of the extent to which a specific keyword targets members of an online social network.

In many instances, audience splitting can be used to provide more accurate matches within specific demographic categories. When sufficiently rich indexing information is acquired, a targeting system can independently optimize for different audiences based upon demographics and compare the predicted effectiveness of the offers based upon the normalized cost functions of the optimal targeting information for each demographic [i.e. comparing measures of how well the targeting keywords match the desired audience in each demographic]. In this way, the amount of advertising to different demographics can be determined based upon the predicted performance of advertising targeting each demographic. The numbers of "hits" can then be utilized in the selection of an optimal set of keywords in the manner outlined above.

Although the present invention has been described in certain specific aspects, variations to the embodiments presented herein are possible without departing from the spirit and scope of the present invention. For example, indexing can be performed across multiple online social networks for the purpose of generating targeting keywords for offers presented by a single online social network or multiple online social networks. In addition, indexing can be performed across a single online social network and used to generate targeting information for offers presented via a different online social network. Thus, embodiments of the present invention should be considered in all respects as illustrative and not restrictive.

What is claimed:

1. An advertising targeting system configured to generate a set of targeting keywords that target a specific offer to a desired audience, the system comprising:

a targeting server system comprising a network interface and a database;

wherein the targeting server system is configured to:

obtain a set of offer keywords comprising the attributes of at least one specific offer within an advertising campaign obtain a set of member profile data from at least one server that forms part of an online social network using the network interface, where a member profile in the obtained member profile data describes activities performed on the online social network associated with the member profiles;

determine member profile affinity metadata for a subset of the set of member profile data, where the member profile affinity metadata describes the affinity of a member profile with respect to a set of specific keywords;

generate a member affinity database stored using the database and containing the member profiles and the determined member profile affinity metadata; and identify targeting keywords within the specific keywords based on the offer keywords and the member affinity database by:

clustering the member profiles within the member affinity database based on the member profile affinity metadata and the offer keywords;

selecting at least one member profile cluster based on the affinity of the member profiles within the member profile cluster to at least one of the offer keywords;

identifying at least one additional keyword within the specific keywords based on the affinity of the member profiles within the selected at least one member profile cluster to the at least one additional keyword; and determining a set of targeting keywords based on the offer keywords and the additional keywords.

2. The advertising targeting system of claim 1, wherein the targeting server system is further configured to provide the targeting keywords to a server that is part of the online social network using the network interface so that the online social network displays the specific offer to members of the online social network targeted using the targeting keywords.

3. The advertising targeting system of claim 1, wherein the targeting server system is further configured to score the affinity between a member profile and the set of specific keywords within data describing an activity associated with the member profile.

4. The advertising targeting system of claim 3, wherein the targeting server system is further configured to determine sentiment related to the set of specific keywords within data describing an activity associated with a member profile.

5. The advertising targeting system of claim 3, wherein the targeting server system is further configured to determine intent related to the set of specific keywords within data describing an activity associated with a member profile.

6. The advertising targeting system of claim 1, wherein the targeting server system is further configured to select the set of specific keywords by clustering the member profiles identified as having associations with an affinity to at least one offer keyword.

7. The advertising targeting system of claim 6, wherein the targeting server system is further configured to:

assign a feature vector to each of the identified keywords; and estimate the performance of the feature vector in targeting the specific offer to the desired audience.

8. The advertising targeting system of claim 7, wherein the feature vector of a keyword includes at least one value indicative of a relationship between the keyword and at least one of the offer keywords.

9. The advertising targeting system of claim 7, wherein the feature vector of a keyword includes at least one value indicative of a relationship between the keyword and at least one cluster of member profiles.

10. The advertising targeting system of claim 6, wherein the targeting server system is further configured to estimate the performance of the feature vector in targeting the specific offer to the desired audience using a classifier.

11. The advertising targeting system of claim 6, wherein the targeting server system is further configured to estimate performance by estimating the click-through rate of advertising targeted using the keyword.

12. The advertising targeting system of claim 1, wherein the targeting server system is further configured to select a set of targeting keyword and demographic information combinations.

13. The advertising targeting system of claim 1, wherein the targeting server system is further configured to select a set of targeting keywords using set completion.

14. A method of generating a set of targeting keywords for targeting a specific offer to members of an online social network, comprising:
   obtaining a set of offer keywords using a targeting server system, where an offer keyword in the set of offer keywords comprises the attributes of at least one specific offer within an advertising campaign;
   obtaining member profiles within one or more online social networks for affinity to a set of specific keywords using a targeting server system that retrieves data concerning member profiles and activities from servers within an online social network;
   determining member profile affinity metadata for a subset of the member profiles describing the affinity for at least one specific keyword using the targeting server system; and
   identifying a set of targeting keywords within the specific keywords that target a desired audience based on the offer keywords and the member profile affinity metadata using the targeting server system by:
      clustering the member profiles within the member affinity database based on the member profile affinity metadata and the offer keywords using the targeting server system;
      selecting at least one member profile cluster based on the affinity of the member profiles within the member profile cluster to at least one of the offer keywords using the targeting server system;
      identifying at least one additional keyword within the specific keywords based on the affinity of the member profiles within the selected at least one member profile cluster to the at least one additional keyword using the targeting server system; and
      determining a set of targeting keywords based on the offer keywords and the additional keywords using the targeting server system.

15. The method of claim 14, further comprising targeting presentation of advertisements for the specific offer to members of an online social network based on the set of targeting keywords using the targeting server system.

16. The method of claim 15, further comprising transmitting the targeted presentation of advertisements to an online social network using the targeting server system.

* * * * *